United States Patent
Yasuoka et al.

(10) Patent No.: US 7,326,378 B2
(45) Date of Patent: Feb. 5, 2008

(54) PROCESS FOR PRODUCING POLYURETHANE GRINDING TOOL

(75) Inventors: Kai Yasuoka, Tokyo (JP); Hitoshi Kurosaki, Tokyo (JP); Kenichi Kazama, Tokyo (JP)

(73) Assignee: Shinano Electric Refining Co., Ltd., Tokyo (JP)

( * ) Notice: Subject to any disclaimer, the term of this patent is extended or adjusted under 35 U.S.C. 154(b) by 511 days.

(21) Appl. No.: 10/947,327

(22) Filed: Sep. 23, 2004

(65) Prior Publication Data

US 2005/0115156 A1    Jun. 2, 2005

(30) Foreign Application Priority Data

Nov. 27, 2003   (JP)   ............... 2003-397241

(51) Int. Cl.
   *B29C 44/02* (2006.01)
(52) U.S. Cl. ............ 264/45.3; 264/162; 523/149
(58) Field of Classification Search ............ 264/45.3, 264/161, 162; 523/149
   See application file for complete search history.

(56) References Cited

U.S. PATENT DOCUMENTS

| | | | |
|---|---|---|---|
| 4,904,280 A * | 2/1990 | Cygan et al. | ............ 51/296 |
| 6,468,138 B1 | 10/2002 | Toyama et al. | |
| 6,641,627 B2 | 11/2003 | Keipert et al. | |
| 6,645,263 B2 * | 11/2003 | Keipert et al. | ............ 51/298 |
| 2002/0177387 A1 | 11/2002 | Keipert et al. | |

FOREIGN PATENT DOCUMENTS

| | | |
|---|---|---|
| EP | 0530646 | 3/1993 |
| GB | 951450 | 7/1964 |
| JP | 2000-24935 | 1/2000 |

OTHER PUBLICATIONS

A copy of European Patent Office Communication for corresponding European Patent Application No. EP04020909 dated Mar. 4, 2005.
A copy of Chinese Office Action for corresponding Chinese Patent application No. 2004100946857, dated Dec. 29, 2006. (citing References AA and AB).

* cited by examiner

*Primary Examiner*—Allan R. Kuhns
(74) *Attorney, Agent, or Firm*—Kratz, Quintos & Hanson, LLP.

(57) ABSTRACT

A process for producing a polyurethane grinding tool is provided, the process including a step of mixing one or more types of polyol component selected from the group consisting of polyether polyols and polyester polyols with inorganic abrasive grains, a step of mixing an organic polyisocyanate component with inorganic abrasive grains, a step of uniformly mixing the polyol component mixed with the abrasive grains and the polyisocyanate component mixed with the abrasive grains by means of a rotary-static mixer, and a step of molding the mixture thus obtained by reacting the mixture in a mold.

6 Claims, 4 Drawing Sheets

PROCESS FOR PRODUCING POLYURETHANE GRINDING TOOL

BACKGROUND OF THE INVENTION

1. Field of the Invention

The present invention relates to a process for producing a polyurethane grinding tool and, in particular, to a process for producing a porous grinding tool for grinding a copper-plated roll, the grinding tool being suitable for grinding the surface of a copper-plated roll for gravure platemaking.

2. Description of the Related Art

Copper-plated rolls for gravure platemaking are made by subjecting a tubular or cylindrical iron core to copper plating, and grinding the surface thereof by means of a porous grinding tool so that the surface is mirror-finished to a degree such that gravure platemaking and printing can be carried out satisfactorily. That is, as shown in FIG. 1, a copper-plated roll 1 for gravure platemaking is rotated at a predetermined speed, and at the same time a porous grinding tool 2 is rotated and run (preferably back and forth) along the axial direction of the roll 1 in intimate contact with the surface of the roll 1 so as to mirror-polish the surface of the roll 1 with the grinding tool 2.

In this case, surface grinding of the roll 1 generally employs a wet grinding method, in which the load imposed on the porous grinding tool 2 is appropriately adjusted and the positions of the grinding tool 2 and the roll 1 are adjusted so that the grinding tool 2 is in contact with the surface of the roll 1 with an appropriate contact area and pressure, and the grinding tool 2 and the roll 1 are rotated around their respective axes of rotation at suitable speeds and the grinding tool 2 is moved back and forth along the axial direction of the roll 1 while water is sprayed onto a grinding site via a nozzle (not illustrated) provided to one side. The angle of inclination of the grinding tool relative to the axis of the roll that is to be ground (angle of the grinding tool) is usually set at less than 0.5°, but in order to increase the grinding speed, there are cases in which the angle is set at greater than 0.5°.

As shown in FIG. 1 or FIG. 2, the grinding tool 2 is typically formed in a disc or squat cylinder shape, and usually has a diameter of about 200 mm and a thickness of about 50 to about 100 mm. The grinding tool 2 is provided with a through hole 3 in its central portion, which communicates coaxially with a hollow rotating shaft 4 for the suction and discharge of grinding debris.

The present applicant has previously disclosed a polyvinyl acetal porous grinding tool as a grinding tool for grinding a copper-plated roll for gravure platemaking (JP-A-2000-24935 (JP-A denotes a Japanese unexamined patent application publication)).

This polyvinyl acetal porous grinding tool is formed by mixing or impregnating a polyvinyl acetal resin, which is a matrix, with a thermosetting resin and an acrylic resin for the purpose of imparting water resistance thereto, but there is still a tendency for the grinding tool to absorb water that is used during grinding and swell, and the pore portion of the grinding tool decreases, thus causing to a certain extent the defect that the grinding tool is easily clogged. In addition, the polyvinyl acetal porous grinding tool disclosed in JP-A-2000-24935 has the drawback that when the angle of the grinding tool during grinding is increased, grinding scratches are easily caused, probably due to the low elasticity of the grinding tool itself.

BRIEF SUMMARY OF THE INVENTION

The present invention has been achieved in order to improve the above-mentioned circumstances, and it is an object thereof to provide a process for producing a porous grinding tool for grinding a copper-plated roll for gravure platemaking, the grinding tool absorbing no moisture in wet grinding, causing little clogging of the grinding tool due to swelling thereof, having elasticity, and being capable of giving an excellent finished surface state.

This object can be attained by a process for producing a polyurethane grinding tool, the process comprising the steps of (1) mixing one or more types of polyol component selected from the group consisting of polyether polyols and polyester polyols with inorganic abrasive grains, (2) mixing an organic polyisocyanate component with inorganic abrasive grains, (3) uniformly mixing the polyol component mixed with the abrasive grains and the polyisocyanate component mixed with the abrasive grains by means of a rotary-static mixer, and (4) molding the mixture thus obtained by reacting the mixture in a mold.

Some preferred embodiments of the above-mentioned polyurethane grinding tool include the bulk density of the grinding tool being 0.40 to 0.60 g/cm$^3$, the amount of inorganic abrasive grains added being 1.0 to 2.0 as a ratio by weight relative to the amount of urethane starting materials (the total amount of the polyol component and the organic polyisocyanate component), and the plan shape of the grinding face of the grinding tool being any one of a regular polygon having four to twenty sides, a gear wheel, and an arced polygon.

The polyurethane grinding tool of the present invention does not absorb moisture and swell even in wet grinding, and has grinding properties, which a conventional grinding tool does not have, that are due to the characteristic elasticity of polyurethane. By combining this with the shape of the grinding face of the grinding tool, it is possible to provide a roll for gravure printing that has no grinding scratches and enables good high precision printing to be carried out.

The polyurethane grinding tool of the present invention can suitably be used not only for grinding a roll for gravure printing but also for grinding in various types of application where surface grinding, and particularly surface grinding to give a mirror finish, is required.

DETAILED DESCRIPTION OF THE INVENTION

Figure 1:
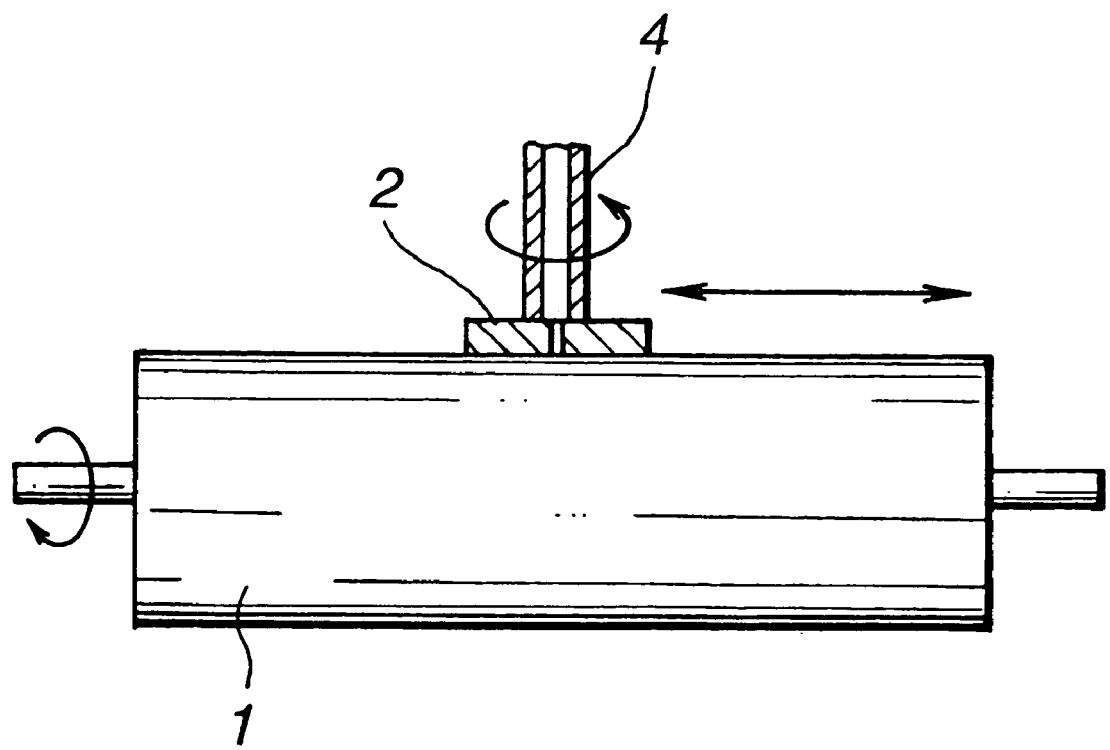
FIG. 1 is a partial cross section which explains a method of grinding a roll using a roll-surface grinding tool.
Figure 2:
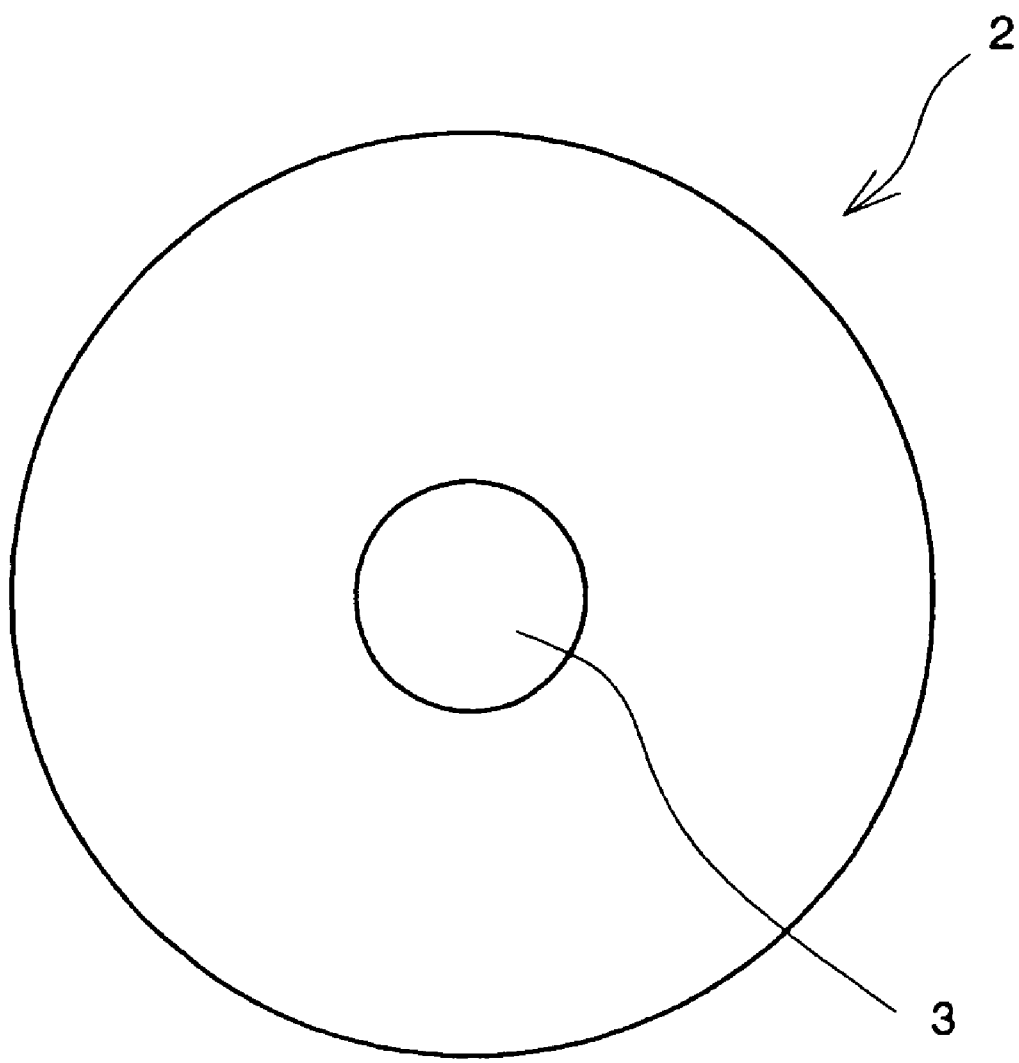
FIG. 2 is a plan view of a circular grinding tool.

As a result of an intensive investigation by the present inventors in order to attain the above-mentioned object, it has been found that, after mixing both an organic polyisocyanate component and a polyol component with inorganic abrasive grains, by mixing these two components uniformly by means of a rotary-static mixer and carrying out a reaction, a uniform polyurethane structure with few voids can be obtained; it has also been found that the use of this polyurethane can give a polyurethane grinding tool that is suitable for grinding a copper-plated roll for gravure platemaking, etc., and the present invention has thus been accomplished. In the steps in which both the organic polyisocyanate component and the polyol component are mixed with the inorganic abrasive grains, it is preferable to mix the abrasive grains with each component as uniformly as possible. In the step in which the polyol component mixed with the abrasive grains and the polyisocyanate component mixed with the abrasive grains are mixed with each other by means of the rotary-static mixer, it is preferable to mix the two components all at once. The 'all at once' referred to here means that mixing is carried out in as short a time as possible.

The process for producing a polyurethane grinding tool of the present invention is explained below in further detail.

The grinding tool of the present invention can be produced by mixing abrasive grains with a polyurethane resin component, and molding and curing the mixture into a predetermined shape.

The polyurethane grinding tool of the present invention contains as described above a polyurethane resin and inorganic abrasive grains as main components, and is preferably formed by foam-molding the polyurethane resin.

The polyurethane resin is formed by a curing reaction between an organic polyisocyanate component and one or more types of polyol component selected from polyether polyols and polyester polyols, the reaction being carried out by uniformly mixing by means of a rotary-static mixer the two components, which have been respectively mixed with the inorganic abrasive grains, thus preventing the occurrence of voids due to the inclusion of bubbles generated when mixing the polyol component and the organic polyisocyanate component, and thereby forming a uniform polyurethane structure.

Examples of the organic isocyanate component include 4,4'-diphenylmethane diisocyanate (hereinafter called MDI) and tolylene-2,4-diisocyanate (hereinafter called TDI).

With regard to the polyol component, one or more types of polyol selected from the group consisting of polyether polyols and polyester polyols can be used. Examples of the polyether polyol include diethylene glycol, triethylene glycol, dipropylene glycol, and tripropylene glycol. With regard to the polyester glycol, various glycols obtained by a reaction between a dibasic acid and an alkylene glycol are representative; examples thereof include a glycol obtained by a reaction between adipic acid and ethylene glycol, a glycol obtained by a reaction between maleic acid and butylene glycol, and a glycol obtained by a reaction between sebacic acid and ethylene glycol, and they can be used singly or in a combination of two or more types. The molecular weight of the polyol component is preferably about 400 to 1,500, and more preferably about 400 to 800.

A simple hand mixing method is known for mixing the polyol component and the organic isocyanate component, but this method causes very bad inclusion of air by stirring during the mixing, and the air remains in a foamed polyurethane molded product, thus forming large voids in the structure of the grinding tool and preventing the grinding tool from having uniform structure.

In the present invention, the polyol component and the organic polyisocyanate component are therefore mixed uniformly by means of a rotary-static mixer, preferably all at once, so as to effect a curing reaction, thus suppressing as far as possible the inclusion of bubbles generated when mixing the polyol component and the organic polyisocyanate component, and thereby preventing the occurrence of voids in the structure of the grinding tool and forming a uniform polyurethane structure.

The rotary-static mixer used in the present invention is a rotor/stator type mixer, and comprises a fixed stator and a rotor rotating at high speed within the stator with a small clearance. Although the discharge rate of the rotor varies depending on the design, it is possible to adjust the shearing efficiency, the mixing efficiency, etc. by means of the clearance between the rotor and the stator and the rotational speed of the rotor (2,000 to 5,000 rpm).

An example of the rotary-static mixer is a type LC 6/3 mixing head used in a TOMAC-TARTLER Nodopox 50 two-component mixing and dispensing machine manufactured by Toho Machinery Co., Ltd. headed in Tokushima Prefecture, Japan.

With regard to the inorganic abrasive grains added to the polyurethane grinding tool produced by the present invention, fine grains having an average particle size ($D_{50}$) of on the order of 1 to 150 μm are preferable and those having $D_{50}$ of the range of 1 to 40 μm are more preferable. Examples of the material of which the grains are made include various types of grinding materials such as silicon carbide, fused alumina, calcined alumina, cerium oxide, chromium oxide, zirconium oxide, zircon sand, and silicon oxide, and they can be used singly or in a combination of two or more.

With regard to the amount of inorganic abrasive grains added, the total amount of inorganic abrasive grains added to the polyol component and the organic polyisocyanate component is preferably 1.0 to 2.0 as a ratio by weight relative to the total amount of the polyol component and the organic polyisocyanate component (urethane starting materials). When the amount of inorganic abrasive grains added relative to the urethane starting materials is in the above-mentioned range, the viscosities of the liquid mixtures of the polyol component and the organic isocyanate component with the inorganic abrasive grains become appropriate such that the flowability becomes so good as to enable the rotary-static mixer to carry out uniform mixing, whereby the curing reaction proceeds smoothly, and a grinding tool thus obtained exhibits a good grinding speed when used for grinding a gravure platemaking copper-plated roll, etc.

After the inorganic abrasive grains are mixed as uniformly as possible with each of the polyol component and the organic isocyanate component, the mixtures are mixed into one mixture and the thus obtained mixture is immediately injected into a mold, and foam molding/solidification is carried out. When the polyol component and the organic isocyanate component, each mixed with the inorganic abrasive grains, are mixed with each other, a foaming reaction starts in about 30 seconds, and the foaming reaction and solidification can be completed in about 30 minutes. It is therefore preferable that, after the two components are mixed uniformly all at once, the mixture is immediately injected into a specified mold, a cover is put on, and the foaming reaction and solidification are allowed to proceed.

At this point, by adjusting the amount of mixture injected into the mold it is possible to freely control the foam molding density of the polyurethane grinding tool. Naturally, the greater the amount of mixture injected into the mold, the higher the foam molding density will be. It is preferable, by utilizing this control, to set the bulk density of the polyurethane grinding tool at 0.40 to 0.60 g/cm$^3$. When the bulk density is in the above-mentioned range, the rate of wear of the grinding tool when grinding a copper-plated roll for gravure platemaking, etc. will not increase and the grinding tool is practical, and since generation of copper powder due to grinding is suppressed, the grinding tool texture is less easily clogged.

The bulk density referred to here is the weight per unit volume and can be calculated from the volume and the weight of the grinding tool.

A method for foam-molding a polyurethane is known, in which the polyol component and the isocyanate component are mixed with a catalyst, a foaming agent, a foaming regulator, etc. as appropriate, and foam molding is carried out. As the foaming agent, water or Freon (a trade mark; chlorofluorocarbon) can be used. In production of the grinding tool of the present invention, it is preferable to employ an in-mold foaming method in which the two starting material components are injected into a mold and foamed.

In the production process of the present invention, the step of foam-molding a polyurethane can employ a chemical foaming agent. As the chemical foaming agent a known foaming agent can be used, and examples thereof include sodium hydrogen carbonate, dinitrosopentamethylenetetramine, sulfonyl hydrazide, azodicarbonamide, p-toluenesulfonyl semicarbazide, 5-phenyltetrazole, diisopropylhydrazodicarboxylate, 5-phenyl-3,6-dihydro-1,3,4-oxadiazin-2-one, and sodium borohydride.

Subsequent to the step in which foam molding is carried out within a mold, the grinding tool thus obtained is subjected to a step in which it is machined into a desired shape. Specifically, a through hole 3 is bored in the polyurethane grinding tool, the thickness of the grinding tool is adjusted, both end faces are subjected to flat machining, side peripheral parts are then subjected to end milling using an NC controlled drilling/tapping machine, and a grinding tool whose grinding face has a predetermined shape as specified below can thus be obtained.

The polyurethane grinding tool of the present invention can have a further improved grinding performance by adopting a grinding tool shape having a specific grinding face.

Examples of preferred shapes of grinding tool end face are those proposed in JP-A-2000-24935 as suitable to the porous grinding tool for roll grinding, namely straight line-sided polygons having four to twenty sides (preferably regular polygons) and these are better than a circle. In the case where the grinding face is a polygon having four to twenty sides, since the area of the grinding tool that can be used for grinding does not decrease, grinding can be carried out with excellent dimensional precision, and the grinding pressure per unit area of the grinding tool does not increase so that wear of the grinding tool itself can be suppressed and, moreover, splashing in the rotational direction of the grinding tool of water sprayed onto a grinding site during grinding can be suppressed, thus avoiding deterioration of the work environment. Furthermore, since the shape is a polygon having at most twenty sides, streak-shaped grinding marks having a large angle of inclination, which would be observed on the surface of a roll that has been ground by a circular grinding tool, are not observed.

Figure 3:
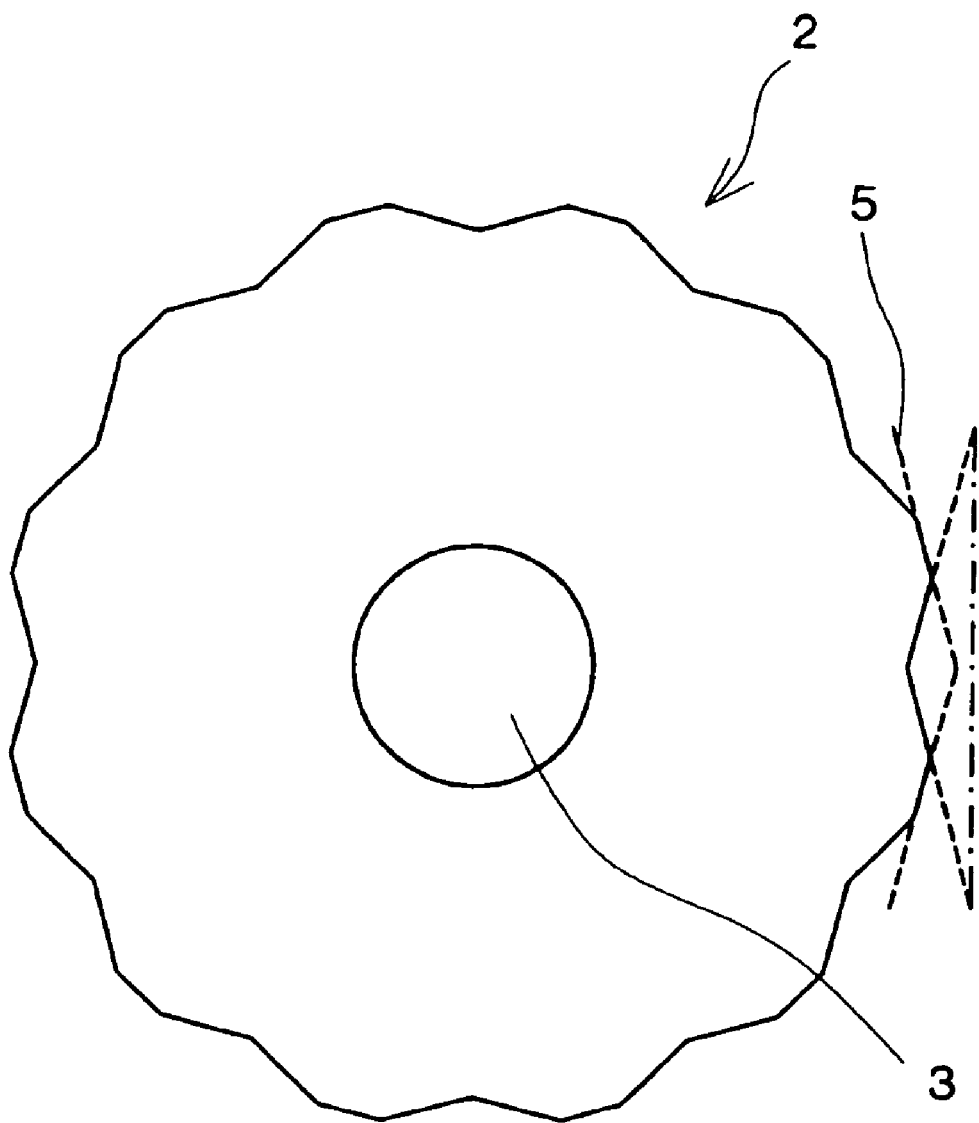
FIG. 3 is a plan view of a grinding tool having a shape that is one embodiment of a gear wheel shape.

Moreover, a gear wheel shape as shown in FIG. 3 is a preferred one, which is obtained by removing a rhomboid from every apex of the polygon, in this case a regular dodecagon. In FIG. 3, reference numeral 5 denotes the sides of the original dodecagon. It is also possible to cut off the apexes along curved lines such as part of oval or ellipse rather than along straight lines to get other preferable shapes.

Figure 4:
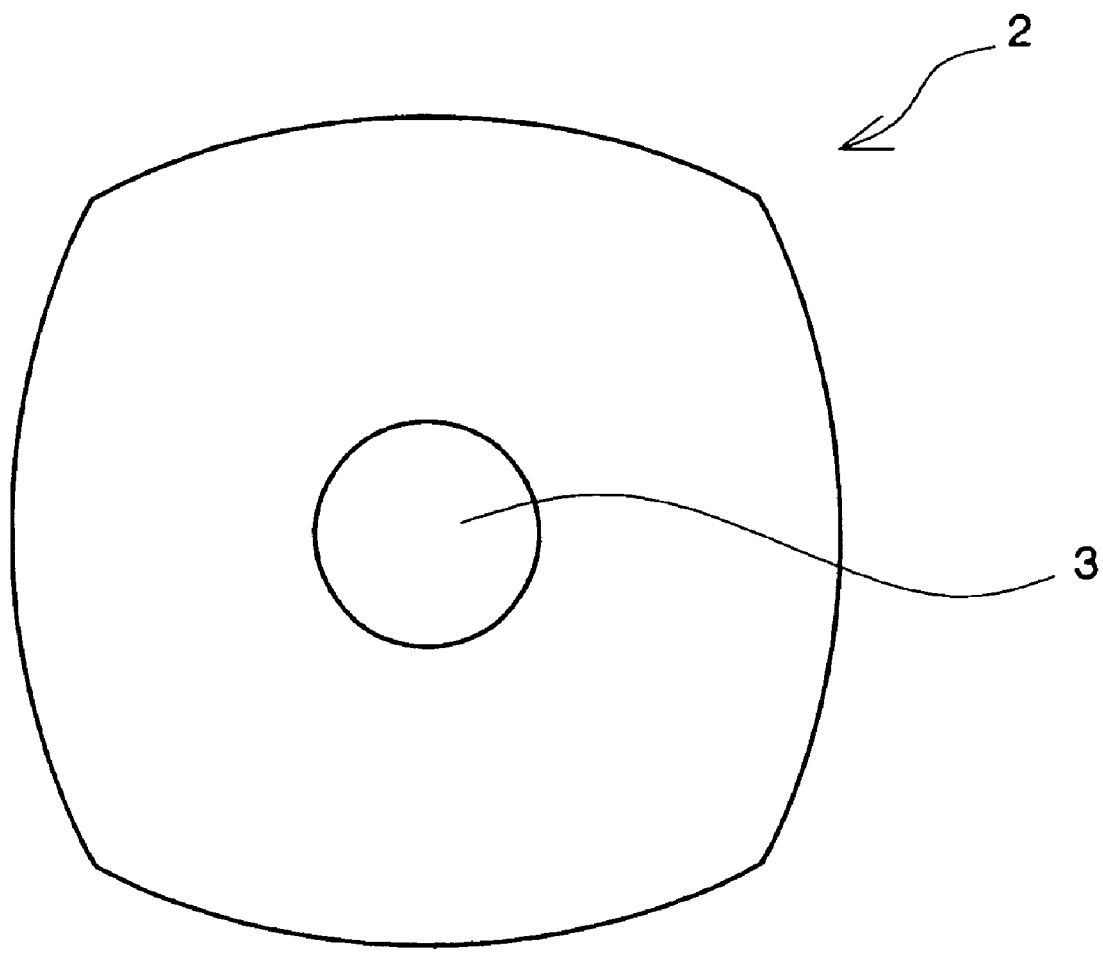
FIG. 4 is a plan view of a grinding tool having a shape that is one embodiment of an arced square shape.

In addition, an arced polygon, in which the straight line sides of a polygon are replaced with arced sides, can also be cited as a preferred example of the grinding tool shape. FIG. 4 illustrates an arced square shape for the grinding tool.

The dimensions of the grinding tool are selected appropriately according to the outer diameter of the roll that is to be ground, etc. For example, when the outer diameter of the roll is on the order of 100 to 500 mm, the diameter of the circle described by the outermost apex(es) of the grinding tool is on the order of 150 to 300 mm and, in particular, 180 to 220 mm, and the thickness thereof is on the order of 50 to 100 mm. As described above, the grinding tool may be provided with a through hole (normally with a diameter of on the order of 10 to 50 mm) for sucking out and discharging grinding debris.

EXAMPLES

Specific modes for carrying out the present invention are explained below with reference to Examples and Comparative Examples, but the present invention is not limited to the Examples below. The following measurement instruments and grinding machine were used in the Examples.

Rotary-static mixer: Type LC 6/3 manufactured by Toho Machinery Co., Ltd. Grinding tool hardness meter: Rockwell hardness meter (Matsuzawa Seiki Co., Ltd.) An HRS value obtained with a test load of 100 kg using a ½ inch diameter steel ball indenter was used.

Grinding machine: Vertical type cylindrical grinding machine (Sanko Kikai K. K.)

Surface roughness meter: Probe type surface roughness meter (Kosaka Laboratory Ltd.)

Instrument for measuring diameter of roll to be ground: DIAMET (K. Walter)

Roll to be ground: Roll having a circumference of 600 mm and a length of 1100 mm with a 150 μm hard copper-plating having a Vickers hardness Hv of 200.

Example 1

50 parts by weight of tripropylene glycol as a polyol component and 50 parts by weight of MDI as an organic isocyanate component were each mixed and stirred with half of 100 parts by weight of silicon carbide abrasive grains (average particle size ($D_{50}$) 10 μm). After confirming that the mixtures were stirred uniformly, the polyol component mixed with the abrasive grains and the organic isocyanate component mixed with the abrasive grains were mixed with each other uniformly all at once by means of a rotary-static mixer; the mixture was immediately injected into a polyurethane mold, and foam molding was carried out. Triethylenediamine as a curing catalyst and a silicon foaming regulator (F305, Shin-Etsu Chemical Co., Ltd.) were used at 1 wt % each relative to the polyol component, and a trace amount of water was used as a foaming agent. The mold size was 215 mmφ×70 mm. The foam molding density could be varied as described above during this injection process.

The grinding tool was taken out of the mold after curing and machined into a shape having an outer diameter of 200 mm, an inner diameter of 50 mm, and a thickness of 50 mm. The grinding tool was further machined into an octagonal shape using a drilling/tapping machine to give a polyurethane grinding tool of the present invention.

Examples 2 to 7

The procedure of Example 1 was repeated except that the component ratio was changed as shown in Table 1, and by machining the grinding tools into various shapes the grinding tools of Examples 2 to 7 shown in Table 1 were obtained.

Examples 8 to 11

The procedure of Example 1 was repeated except that the components shown in Table 2 were used, and the grinding tools of Examples 8 to 11 shown in Table 2 were obtained.

In Example 8, although the total amount of inorganic abrasive grains added to the polyol component and the organic polyisocyanate component did not satisfy the condition that the total amount thereof is 1.0 to 2.0 as a ratio by weight relative to the total amount of the polyol component and the organic polyisocyanate component, the grinding tool obtained could be used in practice.

In Example 9 and Example 10, although the bulk densities of the grinding tools did not satisfy the condition that the bulk density is 0.40 to 0.60 g/cm$^3$, the grinding tools obtained were of a usable quality.

In Example 11, although the shape of the grinding tool did not satisfy the condition that the shape is any one of a regular polygon having four to twenty sides, a gear wheel, and an arced polygon, the grinding tool obtained still had acceptable properties.

After the hardness and the bulk density of each of the grinding tools thus obtained were measured as physical properties of the grinding tools, each of the grinding tools was mounted on a vertical type cylindrical grinding machine, and a hard copper-plated roll having a circumference of 600 mm and a length of 1100 mm, which was the roll to be ground, was ground. Water was used as a grinding liquid, and grinding was carried out for three back-and-forth traverses with a grinding tool rotational speed of 950 rpm, a roll rotational speed of 150 rpm, a grinding tool load of 40 kg, and a grinding tool traverse speed in the roll axial direction of 300 mm/min.

The diameter of the roll was measured before and after grinding using a DIAMET measurement instrument and the thickness of the grinding tool was measured using a vernier caliper, and the grinding depth and the level of wear of the grinding tool were thus obtained. Furthermore, the surface roughness of the surface of the ground roll was measured using the surface roughness meter. The shape of grinding lines on the ground roll and the surface condition of the grinding tool after grinding were inspected visually.

The ground roll thus obtained was subjected to buffing, platemaking, and chromium plating and then used for proofing with a proofing machine, and a visual inspection was carried out to determine whether or not printed material had streak-shaped printing defects due to grinding scratches and grinding lines.

The results of Examples 1 to 7 are summarized in Table 1. Data regarding Examples 8 to 11 are summarized in Table 2.

TABLE 1

Composition, physical properties, and performance of Examples

| | Example 1 | Example 2 | Example 3 | Example 4 | Example 5 | Example 6 | Example 7 |
|---|---|---|---|---|---|---|---|
| Components (wt %) | | | | | | | |
| Polyol component | 25 | 20 | 20 | 20 | 20 | 20 | 17 |
| Organic isocyanate component | 25 | 20 | 20 | 20 | 20 | 20 | 17 |
| Total urethane component | 50 | 40 | 40 | 40 | 40 | 40 | 34 |
| Abrasive grains | 50 | 60 | 60 | 60 | 60 | 60 | 66 |
| Ratio of abrasive grains to urethane | 1.00 | 1.50 | 1.50 | 1.50 | 1.50 | 1.50 | 1.94 |
| Molding density (kg/m$^3$) | 550 | 650 | 550 | 550 | 550 | 470 | 550 |
| Grinding tool shape | octagonal | octagonal | octagonal | arced square | gear | octagonal | octagonal |
| Grinding tool physical properties | | | | | | | |
| Rockwell hardness (HRS) | −90 | −65 | −85 | −85 | −85 | −90 | −70 |
| Grinding tool bulk density (g/cm$^3$) | 0.50 | 0.58 | 0.50 | 0.50 | 0.50 | 0.43 | 0.50 |
| Grinding performance | | | | | | | |
| Grinding depth (μm/back-and-forth traverse) | 5.5 | 5.5 | 6.0 | 6.0 | 6.0 | 6.5 | 5.5 |
| Tool wear (μm/back-and-forth traverse) | 150 | 150 | 200 | 200 | 200 | 250 | 150 |
| Surface roughness (Ra μm) | 0.09 | 0.09 | 0.09 | 0.09 | 0.09 | 0.09 | 0.09 |
| Clogging of grinding tool | none | none | none | none | none | none | none |
| Grinding line shape relative to circumferential direction of roll | oblique chevron | oblique chevron | oblique chevron | chevron | scale | oblique chevron | oblique chevron |
| Presence of grinding scratches | none | none | none | none | none | none | none |

TABLE 2

Composition, physical properties, and performance of Examples

| | Example | | | |
|---|---|---|---|---|
| | 8 | 9 | 10 | 11 |
| Components (wt %) | | | | |
| Polyol component | 27 | 20 | 20 | 20 |
| Organic isocyanate component | 27 | 20 | 20 | 20 |
| Total urethane component | 54 | 40 | 40 | 40 |
| Abrasive grains | 46 | 60 | 60 | 60 |
| Ratio of abrasive grains to urethane | 0.85 | 1.50 | 1.50 | 1.50 |
| Molding density (kg/m$^3$) | 550 | 380 | 680 | 550 |
| Grinding tool shape | octagonal | octagonal | octagonal | circular |
| Grinding tool physical properties | | | | |
| Rockwell hardness (HRS) | −90 | −100 | −55 | −85 |
| Grinding tool bulk density (g/cm$^3$) | 0.45 | 0.35 | 0.62. | 0.50 |
| Grinding performance | | | | |
| Grinding depth (μm/back-and-forth traverse) | 3.5 | 6.5 | 3.0 | 6.0 |
| Tool wear (μm/back-and-forth traverse) | 100 | 500 | 50 | 200 |
| Surface roughness (Ra μm) | 0.08 | 0.10 | 0.08 | 0.09 |
| Clogging of grinding tool | some | none | some | none |
| Grinding line shape relative to circumferential direction of roll | oblique chevron | oblique chevron | oblique chevron | flat |
| Presence of grinding scratches | some | none | some | some |

It can be seen from the results in the tables that the grinding tools having an abrasive grain/urethane ratio of 1.0 to 2.0 and a bulk density of 0.40 to 0.60 cm3 are free from clogging and have excellent grinding performance. Furthermore, it has been confirmed that, by combining this with the preferred shape of the grinding tool, printed material after proof printing has no streak-shaped printing defects due to grinding scratches and grinding lines, thus giving high precision printing.

On the other hand, when the shape of the grinding mark is of a flat type, streak-shaped printing marks are caused. The 'flat type' referred to here means a large number of parallel streak-shaped grinding lines at narrow intervals along the peripheral direction on the surface of a ground roll.

In accordance with the present invention, since a copper-plated roll for gravure platemaking can be ground to a mirror finish with high performance, it is possible to obtain high resolution printed images by gravure printing.

What is claimed is:

1. A process for producing a polyurethane grinding tool, the process comprising the steps of:
   mixing one or more types of polyol component selected from the group consisting of polyether polyols and polyester polyols with inorganic abrasive grains;
   mixing an organic polyisocyanate component with inorganic abrasive grains;
   the total amount of inorganic abrasive grains added and mixed with the polyol component and the organic polyisocyanate component is 1.0 to 2.0 as a ratio by weight relative to the total amount of the polyol component and the organic polyisocyanate component;
   uniformly mixing the polyol component mixed with the abrasive grains and the polyisocyanate component mixed with the abrasive grains by means of a rotary-static mixer;
   foam molding the mixture thus obtained by reacting the mixture in a mold so that the bulk density is 0.40 to 0.60 g/cm$^3$; and
   machining the molded grinding tool so that the plan shape thereof is any one of a regular polygon having four to twenty sides, a gear wheel, and an arced polygon.

2. The process according to claim 1, wherein the organic polyisocyanate component is either 4,4'-diphenylmethane diisocyanate or tolylene-2,4-diisocyanate.

3. The process according to claim 1, wherein the polyol component is selected from the group consisting of polyether polyol, diethylene glycol, triethylene glycol, dipropylene glycol, and tripropylene glycol.

4. The process according to claim 1, wherein the inorganic abrasive grains are selected from the group consisting of silicon carbide, fused alumina, calcined alumina, cerium oxide, chromium oxide, zirconium oxide, zircon sand, and silicon oxide.

5. The process according to claim 1, wherein the inorganic abrasive grains have an average particle size ($D_{50}$) of 1 to 150 microns.

6. The process according to claim 1 wherein said machining step comprises first obtaining a regular polygon in plane shape and then trimming apexes thereof.

* * * * *